United States Patent [19]

Berry

[11] 3,838,803
[45] Oct. 1, 1974

[54] SEPARATION OF GLASS SHEET MATERIAL

[75] Inventor: Ronald Frank Berry, Hindley Green, near Wigan, England

[73] Assignee: Pilkington Brothers Limited, Liverpool, England

[22] Filed: Oct. 17, 1972

[21] Appl. No.: 298,386

[30] Foreign Application Priority Data
Oct. 19, 1971 Great Britain ............. 48655/71

[52] U.S. Cl. ............. 225/98, 83/98, 83/107, 198/31 R, 214/1 BE, 302/31
[51] Int. Cl. ............. B65h 35/10
[58] Field of Search ......... 198/31 R, 127 R, 78, 81; 214/1 BE, 1 S; 302/2 R, 31, 29; 271/59, 195, 250, 251; 65/25 A, 182 A; 83/98, 99, 102 R, 107; 225/98

[56] References Cited
UNITED STATES PATENTS
3,301,550 11/1967 Reinecke .............. 83/102
3,503,607 3/1970 Gluskin .............. 302/29
3,685,632 8/1972 Brady .............. 198/31 R Primary Examiner—Evon C. Blunk
Assistant Examiner—Joseph E. Valenza
Attorney, Agent, or Firm—Burns, Doane, Swecker & Mathis

[57] ABSTRACT

In apparatus for separating two adjacent portions cut from a glass sheet, a conveyor advances the portions so that one portion passes over an air box providing a gas cushion to support the portion. Air jets are directed against the portion on the gas cushion i.e. direction away from the other portion so that the two portions move laterally apart. The conveyor may pass between two air boxes at opposite sides of the conveyor, air jets at the two air boxes being arranged to move outwardly portions cut from two opposite edges of a sheet of glass.

15 Claims, 7 Drawing Figures

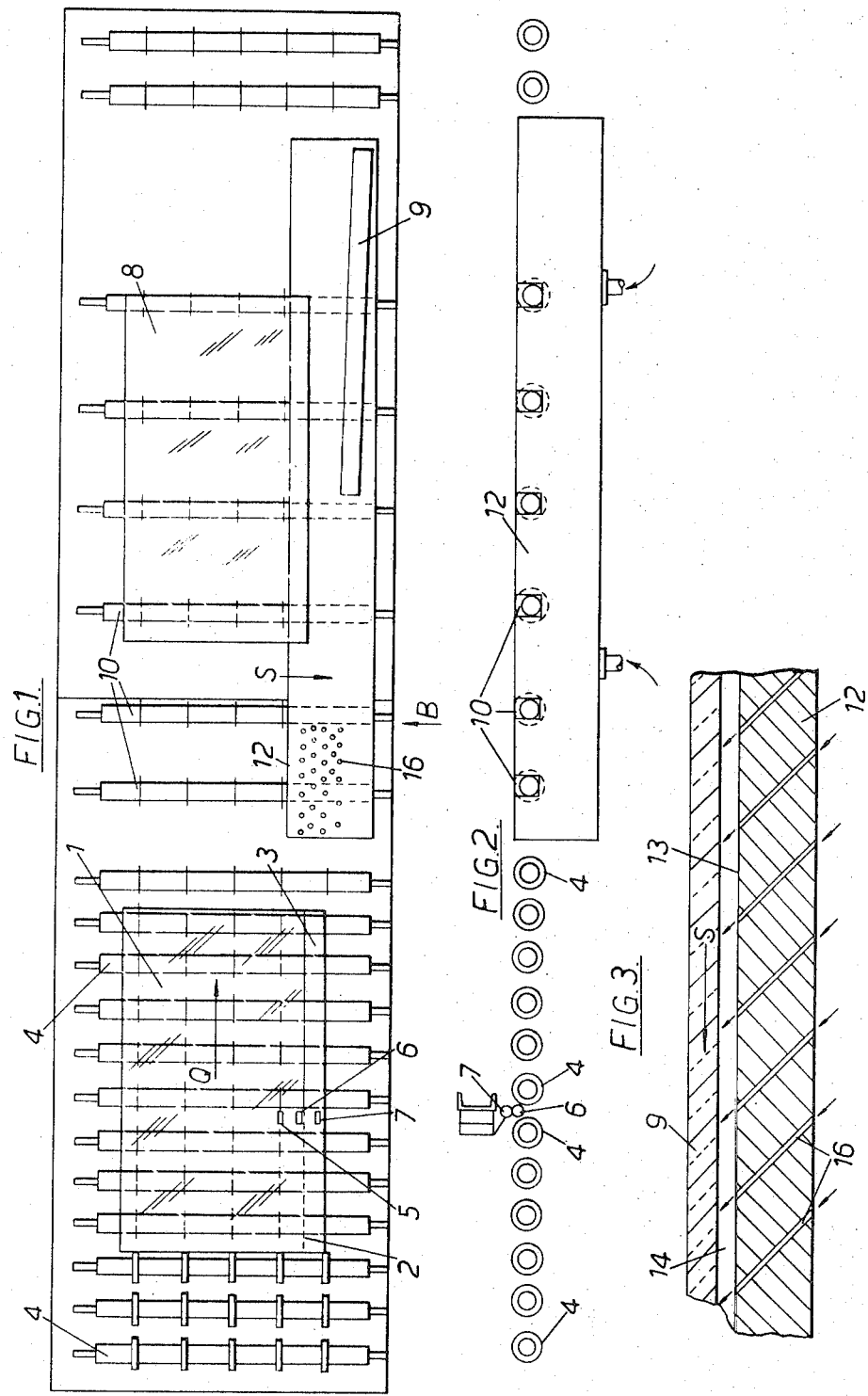

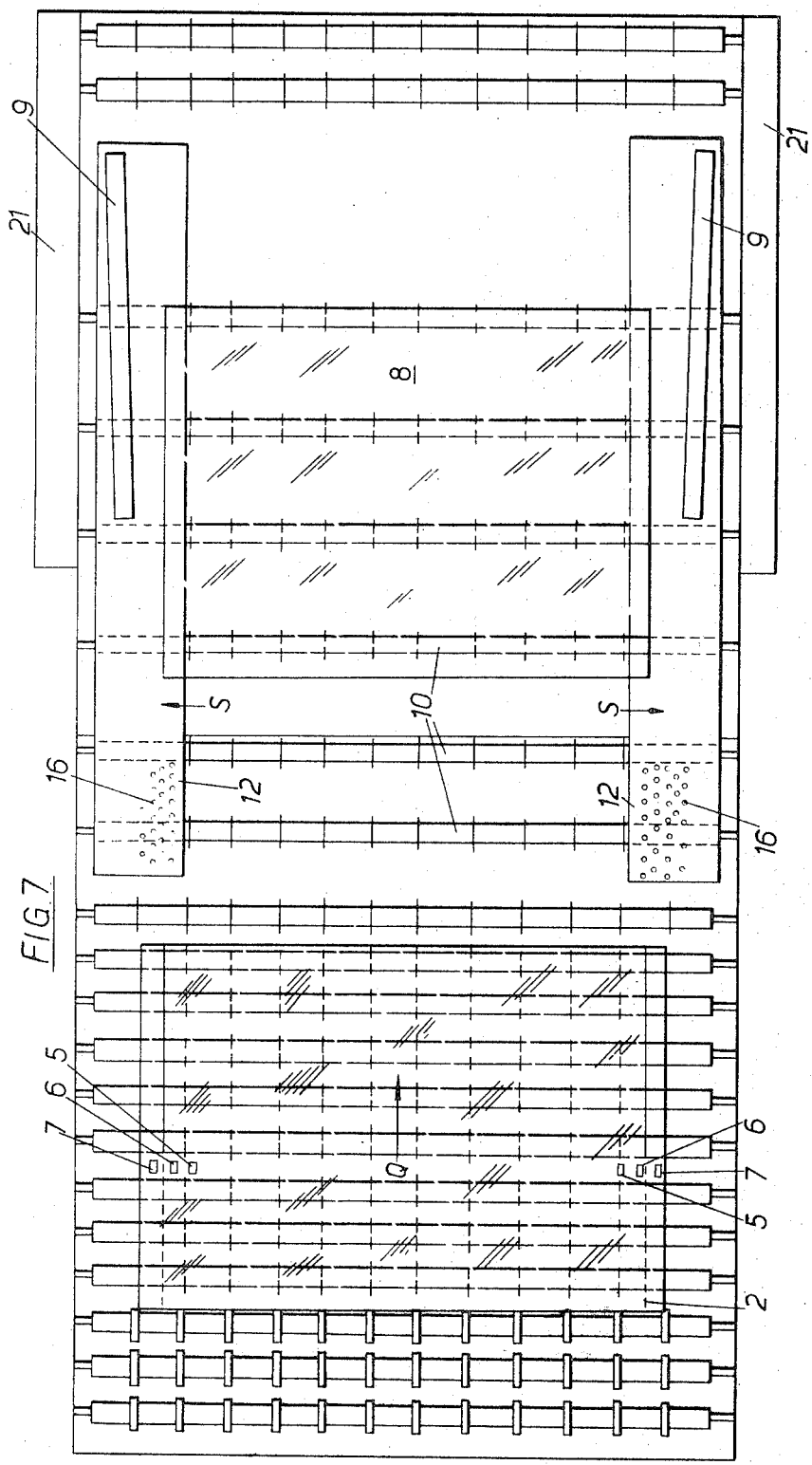

SEPARATION OF GLASS SHEET MATERIAL

BACKGROUND OF THE INVENTION

This invention relates to methods of and apparatus for separating two adjacent portions of a previously cut glass sheet moving together along parallel paths in a generally horizontal plane.

In the manufacture of glass in sheet form, glass sheet or ribbon is commonly conveyed along a horizontal conveyor and cut into separate sheets or cut to remove unwanted selvedge portions. The selvedge portions normally comprise elongated strips cut from two opposite edges of the sheet. When a cut has been made along the direction of the conveyor path it is commonly desirable to effect lateral separation of the two cut portions to facilitate subsequent handling of the two portions. In the removal of selvedge, the cut selvedge portion or portions must be separated from the remainder of the sheet.

It is an object of the present invention to provide improved apparatus and methods for separating two adjacent portions of a cut glass sheet.

SUMMARY OF THE INVENTION

According to the present invention there is provided apparatus for separating two adjacent portions of a previously cut glass sheet moving together along parallel paths in a generally horizontal plane, comprising a conveyor for advancing said portions of the sheets along their respective paths, and means for producing a gaseous cushion for supporting at least one of the portions of the sheet and for directing gas against at least one of the major surfaces of said one portion of the sheet with a component in a direction away from the other portion of the sheet to move said one portion of the sheet laterally away from the other portion of the sheet.

Preferably the means for producing a gaseous cushion comprise a gas box extending along the path of said one portion of the sheet, said gas box having an upper wall which is parallel to a support surface of the conveyor and arranged to support the said one portion of the sheet in the same plane as the other portion, the upper wall of the box being provided with a plurality of outlet ducts to direct gas against the undersurface of said one portion of the sheet to create said gaseous cushion for supporting said one portion of the sheet.

In one form of the invention said ducts in said upper wall of the gas box may be arranged to direct gas against the undersurface of said one portion of the sheet at an angle to the vertical and away from said other portion of the sheet.

The apparatus may be arranged to separate two opposite edge regions from a glass sheet and in this case the apparatus may include two air boxes located at opposite sides of the conveyor so that opposite edges of the sheet pass over respective gas boxes on moving along the conveyor, each gas box having gas outlet ducts arranged to provide a gaseous cushion for supporting the overlying edge region and the direction of the ducts being inclined away from the conveyor so that the gas flow causes the edge portions to move laterally outwards away from the centre portion of the sheet.

The invention also provides a method of separating two portions of a previously cut glass sheet moving along a generally horizontal path, comprising supporting at least one of the portions of the sheet on a gaseous cushion and directing gas against a surface of said one portion of the sheet with a component in a direction away from the other portion of the sheet to impart to said one portion of the sheet a component of movement in said direction thereby separating said two portions of the sheet.

BRIEF DESCRIPTION OF THE DRAWINGS

FIG. 1 is a plan view of apparatus for cutting an unwanted edge portion from a sheet of glass and for separating the cut edge portion from the remainder of the glass sheet;

FIG. 2 is a side elevation of the apparatus shown in FIG. 1, seen in the direction of the arrow "B."

FIG. 3 is an enlarged transverse section of the edge portion of the glass sheet being supported on the air box of the apparatus shown in FIG. 1 and being separated from the remainder of the glass sheets;

FIG. 7 shows a plan view similar to FIG. 1 of an embodiment for removing two opposite selvedge portions from a glass sheet.

DESCRIPTION OF THE PREFERRED EMBODIMENTS

Figure 4:
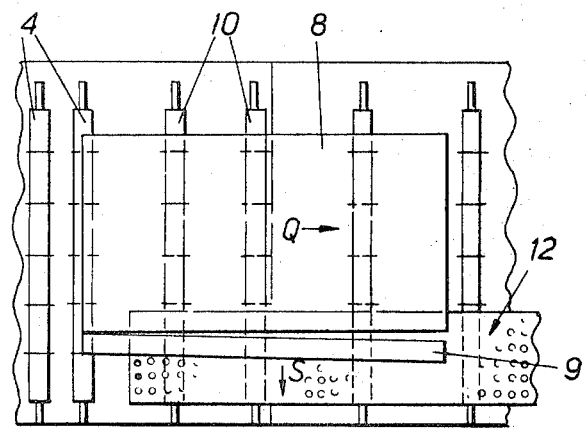
FIG. 4 is a partial plan view of the apparatus shown in FIG. 1 illustrating the initial manner of separation of the edge portion from the remainder of the glass sheet.

Referring to FIGS. 1 to 4, a sheet of glass 1 is conveyed along a generally horizontal path in a direction Q supported on a succession of tyred rollers 4 of a roller conveyor which are coupled to drive means (not shown). The sheet 1, which is one of a succession of sheets conveyed by the rollers 4, has previously been scored longitudinally along a line 2 to demarcate between an unwanted edge portion or selvedge 3 of the sheet and the remainder of the sheet. During the advancement of the sheet 1 along the roller conveyor, a cut along the score line 2 is induced in known manner by spaced apart upper rollers 5 and 7 which contact the top surface of the glass sheet 1 on either side of the score line 2, and an intermediate lower roller 6 which contacts the undersurface of the glass sheet beneath the score line. The upper periphery of the lower roller 6 is disposed in a plane slightly above that of the lower surface of the glass sheet 1, i.e. the conveying level of the rollers 4, so that the leading end of the sheet is raised off the rollers 4 whereupon the upper rollers 5 and 7 induce a strain across the score line 2 which causes a cut to run along the score line thus severing the edge portion 3 from the remainder of the glass sheet. Consequently the glass sheet 1 is severed into a plate 8 and a detached selvedge portion 9.

The plate 8 and detached selvedge portion 9 are then conveyed closely side by side along parallel paths in a horizontal plane, from the upstream rollers 4 towards a succession of downstream tyred rollers 10 driven in unison with the rollers 4. This downstream section of the roller conveyor supports only the main plate 8 and is thus, in effect, of narrower width than the preceding upstream section constituted by the tyred rollers 4. Alongside the downstream rollers 10 and extending longitudinally of the conveyor is an air box 12 for producing a gaseous cushion 14 for supporting the selvedge portion 9 and, in this example, to cause lateral separation of the selvedge away from the plate 8 in the direction of the arrow S.

The air box 12 has a flat upper wall 13 which extends parallel to but slightly below the conveying surface of the rollers 4 and 10. As can be seen from FIG. 1, the air box 12 is so located that one edge of the plate 8 slightly overlaps it during forward travel of the plate and the whole of the selvedge 9 travels over the air box. The width of the box 12 is much smaller than the width of the rollers 10 so that the major area of the sheet 8 does not pass over the box. The air cushion 14 supports the selvedge 9 in the same plane as the plate 8.

The air box 12 is connected to a source of pressurised air and is provided with a number of air outlet ducts 16 in its upper wall 13 through which air is blown for producing the air cushion 14 beneath the detached selvedge portion 9. The ducts 16 are formed parallel to each other and at an angle to the vertical plane of the path of the selvedge 9 and away from the plate 8. Thereby the air flow from the ducts 16 not only supports the selvedge 9 but also imparts to the selvedge a lateral component of motion away from the plate 8 in the direction indicated by arrow S. As a result of this lateral component, the selvedge 9 is displaced and separated from the plate 8. Conveniently a suitable container may be disposed alongside the edge of the air box 12 remote from the conveyor rollers 10 and as the air box is formed without side walls the selvedge 9 passes over the edge of the box and falls into the container.

Regarding FIG. 4, it will be appreciated that the separation of the selvedge portion 9 from the plate 8 is a gradual process since the cutting of the selvedge is performed upstream of the air box 12. As the leading edge of the selvedge passes over the air box 12, the leading edge will be displaced away from the plate 8 so opening up an angle between the selvedge and the plate. This angle will gradually increase until the selvedge is wholly over the air box, whereupon the selvedge will be displaced bodily towards the outer edge of the air box into the separated position shown in FIG. 1. This angle of separation or wedge angle between the selvedge 9 and the plate 8, and the speed of separation will depend on a number of factors such as the speed of the glass plate and the selvedge whilst they are supported on the upstream rollers 4, and the angle of inclination of the ducts 16 both to the undersurface of the selvedge and to the vertical plane of the general forward path of the selvedge. The ducts 16 are preferably inclined to the undersurface of the selvedge at an angle between 30° and 45°.

Although the conditions of air flow and the angle of the ducts 16 may be chosen to meet particular requirements, selvedge separation has been found particularly effective with a horizontal air box 12 having air ducts 16 at an angle of 30° to the undersurface of the selvedge 9 and in a plane perpendicular to the direction of flow of the glass i.e. the vertical plane of the general forward path of the selvedge. With this arrangement it was found that sections of glass of 4 mm thickness were lifted about 0.4 mm from the upper surface of the air box 12 by an air flow of 0.07 $m^3.sec^{-1}$. However, the invention is not limited to this particular arrangement of ducts or these parameters of air flow.

Figure 5:
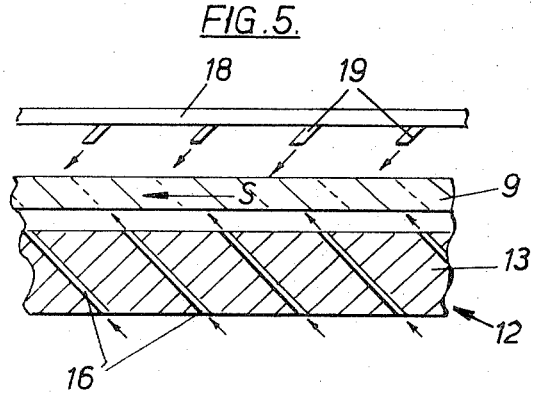
FIG. 5 is a section similar to FIG. 3 of a modified form of apparatus.

In another embodiment, part of which is shown in FIG. 5, there is disposed above the upper wall 13 of the air box 12 a succession of transverse air pipes 18 (only one of which is shown) connected to a common supply line extending longitudinally of the air box. Each pipe 18 has a plurality of nozzles 19 depending from it towards the top surface of the selvedge 9. These nozzles are provided in addition to the ducts 16 in the upper wall 13 of the air box, and likewise are angled to the selvedge and are perpendicular to the general forward path of the selvedge. The air from the nozzles 19 and the ducts 16 thus combines to cause the separation of the selvedge from the plate 8. However, the orientation of the nozzles 19 and the rate of emission of air from these nozzles may be altered depending on the speed of separation desired and the dimensions of the selvedge.

In this embodiment, the ducts 16 in the upper wall 13 of the air box may be disposed to provide a gaseous cushion support only for the selvedge 9 as it is directed laterally over the air box 12 by the air emitted from the nozzles 19 above the selvedge. In this case, the ducts 16 may be vertical or extend forwardly or backwardly substantially longitudinally of the air box 12.

Figure 6:
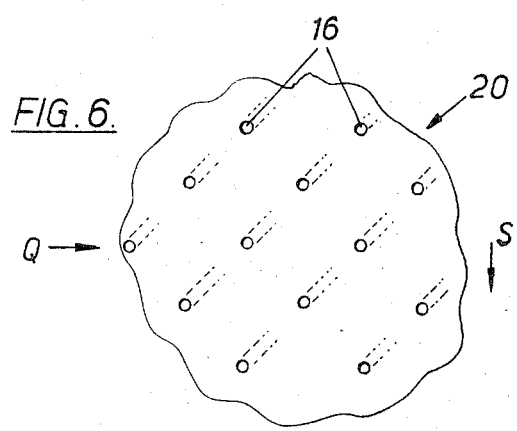
FIG. 6 is a plan view of the air box of a further form of apparatus.

FIG. 6 shows part of the upper surface of a modified air box 20 in which the ducts 16 are angled both rearwardly to the general forward path of the selvedge 9 and away from the plate 8. Hence the air emitted from the ducts imparts a retardation force on the selvedge at the same time as displacing it laterally away from the plate.

In this way a certain degree of retardation of the selvedge may be obtained which may facilitate its removal.

Although the above examples have been described with reference to the removal of only one selvedge portion from a sheet, the invention may be used for the simultaneous removal of two selvedge portions from opposite sides of the sheet. Such an apparatus is shown in FIG. 7 which shows apparatus similar to that of FIG. 1 and the same reference numerals are used for similar parts. In this case rollers 5, 6 and 7 are provided at each side of the conveyor 4 for opening cuts along selvedge portions 3 at each side of the sheet 1. Similarly an air box 12 is provided at each side of the conveyor so that the two selvedge portions at opposite sides of the sheets are simultaneously displaced outwardly away from the sheet and fall into receptacles 21 placed alongside the air boxes 12. The operation of each half of the apparatus shown in FIG. 7 is the same as previously described with reference to FIG. 1.

The invention is not limited to the removal of selvedge portions from a glass sheet. For example, the invention may be applied to separating the two portions of a glass sheet which has been split down the centre or divided in any other way.

Also, gas other than air may be blown through the ducts 16 and, if provided, the nozzles 19.

It will be appreciated that if desired the apparatus as shown in FIG. 7 can also be used for simultaneously removing one selvedge portion from each of a pair of separate sheets travelling along the conveyor in side-by-side relationship, for example which have been produced by prior centre-splitting of a single larger sheet.

I claim:

1. Apparatus for separating mutually abreast portions of a previously cut glass sheet moving together along parallel paths in a generally horizontal plane, said apparatus comprising:
   a conveyor having:
      an upstream section for supporting and advancing the abreast portions of the glass sheet together along their respective parallel paths, and
      a downstream section of narrower width than the upstream section for supporting and continuing to advance one of the glass sheet portions received from said upstream conveyor section,
   gas supply means including a gas box disposed abreast of said downstream conveyor section for receiving the other glass sheet portion from said upstream conveyor section and directing gas against at least the underside of said other glass sheet portion with a component in a direction away from said one glass sheet portion to:
      support said other glass sheet portion, and
      move said other glass sheet portion in a direction generally laterally away from said one glass sheet portion.

2. Apparatus according to claim 1, wherein the said gas supply means comprise a gas box extending along the path of said one portion of the sheet, said gas box having an upper wall which is parallel to a support surface of the conveyor and arranged to support the said other portion of the sheet in the same plane as the one portion, the upper wall of the box being provided with a plurality of outlet ducts to direct gas against the undersurface of said other portion of the sheet to create said gaseous cushion for supporting said other portion of the sheet.

3. Apparatus according to claim 2, wherein said ducts in said upper wall of the gas box are arranged to direct gas against the undersurface of said other portion of the sheet at an angle to the vertical and away from said one portion of the sheet.

4. Apparatus according to claim 2, including a plurality of nozzles arranged to direct gas against the top surface of said other portion of the sheet at an angle to the vertical plane of the path of said other portion of the sheet and away from the one portion of the sheet.

5. Apparatus according to claim 3, wherein said ducts are inclined to said surface of said other portion of the sheet at an angle between 30° and 45°.

6. Apparatus according to claim 5, wherein said ducts are arranged to direct gas in a direction perpendicular to said path of said other portion of the sheet.

7. Apparatus according to claim 5, wherein said ducts are inclined to the vertical plane of the path of said other portion of the sheet in a partially rearward direction to impart a retarding force on said other portion of the sheet.

8. A method of separating mutually abreast portions of a previously cut glass sheet moving together along parallel paths in a generally horizontal plane comprising the steps of:
   engagingly supporting and advancing both glass sheet portions along their respective parallel paths on an upstream driven conveyor section,
   delivering a first of said glass sheet portions to a downstream driven conveyor section of less width than said upstream conveyor section;
   engagingly supporting and continuing to advance said first glass sheet portion on said downstream conveyor section;
   delivering a second of said glass sheet portions to a gas supply means;
   directing gas from said gas supply means against the underside of said second glass sheet portion in a direction away from said first glass sheet portion to:
      support said second glass sheet portion at substantially the same elevation as said first glass sheet portion, and
      move said second glass sheet portion generally laterally away from said first glass sheet portion; and
   advance said first glass sheet portion along said downstream conveyor section with said first glass sheet portion overlapping said gas supply means in a manner assuring that said second glass sheet portion remains out of engagement with said downstream conveyor section and that said glass sheet portion overlies said gaseous cushion.

9. Apparatus according to claim 1, wherein said gas box is of narrow width relative to the downstream section of the conveyor.

10. Apparatus according to claim 1, including means for cutting said moving sheet of glass longitudinally into said two portions, said cutting means being disposed upstream of the means for directing gas at said other portion of the sheet to separate it laterally from said one portion.

11. Apparatus according to claim 1, for separating two opposite edge regions from a glass sheet, which apparatus includes two air boxes located at opposite sides of the conveyor so that opposite edges of the sheet pass over respective gas boxes on moving along the conveyor, each gas box having gas outlet ducts arranged to provide a gaseous cushion for supporting the overlying edge region and the direction of the ducts being inclined away from the conveyor so that the gas flow causes the edge portions to move laterally outwards away from the centre portion of the sheet.

12. Apparatus according to claim 1 including a receptacle adjacent the side of the gaseous cushion remote from the conveyor for receiving the portion of glass sheet which is displaced laterally by the gas.

13. A method of separating mutually abreast portions of a previously cut glass sheet moving together along parallel paths in a generally horizontal plane, the method comprising the steps of:
   supporting and advancing said abreast glass sheet portions along their respective parallel paths on an upstream conveyor section,
   delivering one of said glass sheet portions to a downstream conveyor section of less width than said upstream conveyor section,
   supporting and continuing to advance said one glass sheet portion on said downstream conveyor section;
   delivering the other glass sheet portion to a gas supply means having a gas box disposed abreast of said downstream conveyor section,
   directing gas from said gas box against the underside of said other glass sheet portion in a direction away from said one glass sheet portion to support said other glass sheet portion and move said other glass sheet portion in a direction generally laterally away from said one glass sheet portion.

14. A method of separating portions of a glass sheet that has been previously cut into a main portion and two end selvedge portions traveling together mutually abreast along parallel paths in a generally horizontal plane, the method comprising the steps of:

supporting and advancing said abreast glass sheet portions along their respective parallel paths on an upstream conveyor section, delivering one of said glass sheet portions to a downstream conveyor section of less width than said upstream conveyor section;

supporting and continuing to advance said one glass sheet portion on said downstream conveyor section;

delivering the other glass sheet portions to respective gas supply means each having a gas box located abreast of said downstream conveyor means on opposite sides thereof;

directing gas from each gas box against the underside of said other glass sheet portions in directions away from said one glass sheet portion to support said other glass sheet portions and move said other glass sheet portions in directions generally laterally away from said one glass sheet portion.

15. Apparatus for separating mutually abreast portions of a previously cut glass sheet moving together along parallel paths in a generally horizontal plane, said apparatus comprising:

driven conveyor means including
an upstream conveyor section for engagingly supporting and advancing said glass sheet portions along their respective parallel paths, and
a downstream conveyor section, of less width than said upstream conveyor section, for engagingly supporting and advancing a first of said glass portions;

gas supply means being disposed abreast of said downstream conveyor section for producing a gaseous cushion to support said second glass sheet portion at substantially the same elevation as said first glass sheet portion;

said gas supply means being arranged so that said first glass sheet portion, as it is advanced by said downstream conveyor section, overlaps said gas supply means in a manner assuring that said second glass sheet portion remains out of engagement with said downstream conveyor section and that said second glass sheet portion overlies said gaseous cushion;

said gas supply means being arranged to direct gas against the underside of said second glass sheet portion with a directional component oriented away from said first glass sheet portion so that said second glass sheet portion is moved generally laterally away from said first glass sheet portion.

* * * * *